United States Patent
Jonsson

(10) Patent No.: US 10,896,251 B2
(45) Date of Patent: Jan. 19, 2021

(54) METHOD FOR AUTHENTICATING SOFTWARE

(71) Applicant: SAAB AB, Linköping (SE)

(72) Inventor: Mats Jonsson, Sollentuna (SE)

(73) Assignee: SAAB AB, Linköping (SE)

( * ) Notice: Subject to any disclaimer, the term of this patent is extended or adjusted under 35 U.S.C. 154(b) by 177 days.

(21) Appl. No.: 16/063,054

(22) PCT Filed: Dec. 15, 2016

(86) PCT No.: PCT/SE2016/051259
§ 371 (c)(1),
(2) Date: Jun. 15, 2018

(87) PCT Pub. No.: WO2017/105326
PCT Pub. Date: Jun. 22, 2017

(65) Prior Publication Data
US 2018/0365407 A1    Dec. 20, 2018

(30) Foreign Application Priority Data
Dec. 15, 2015 (SE) ........................................ 1551649

(51) Int. Cl.
*G06F 21/44* (2013.01)
*G06F 21/53* (2013.01)
(Continued)

(52) U.S. Cl.
CPC .............. *G06F 21/44* (2013.01); *G06F 21/16* (2013.01); *G06F 21/53* (2013.01); *G06F 21/554* (2013.01);
(Continued)

(58) Field of Classification Search
CPC ........ G06F 21/44; G06F 21/57; G06F 21/577; G06F 21/16; G06F 21/554; G06F 21/53;
(Continued)

(56) References Cited

U.S. PATENT DOCUMENTS 8,966,318 B1 * 2/2015 Shah ................... G06F 11/3664
714/28
9,038,184 B1 * 5/2015 Mann .................... G06F 21/562
726/24
(Continued)

OTHER PUBLICATIONS

European Office Action issued in corresponding European Patent Application No. 16 816 432.5 dated Oct. 22, 2019 (9 pages).
(Continued)

*Primary Examiner* — Michael Pyzocha
(74) *Attorney, Agent, or Firm* — Jeffri A. Kaminski; Venable LLP

(57) ABSTRACT

The present invention relates to a method for authenticating software. The method comprises defining a set of parameters to use for trace mapping the software, wherein the set of parameters represents the software functionality when executed. The method further comprises: a) creating a trusted fingerprint that is created by trace mapping the software using the set of parameters when executed in a trusted environment; b) creating an operating fingerprint that is created by trace mapping the software using the set of parameters when executed in an operating environment; c) comparing the operating fingerprint with the trusted fingerprint, and identifying any difference between the trusted fingerprint and the operating fingerprint; and d) when said operating fingerprint is non-identical with the trusted fingerprint, initiating predefined action(s) in response to the identified differences between the trusted fingerprint and the operating fingerprint.

21 Claims, 7 Drawing Sheets

(51) Int. Cl.
*G06F 21/55* (2013.01)
*G06F 21/57* (2013.01)
*G06F 21/16* (2013.01)

(52) U.S. Cl.
CPC ............ *G06F 21/57* (2013.01); *G06F 21/577* (2013.01); *G06F 2201/865* (2013.01); *G06F 2221/033* (2013.01); *H04L 2209/127* (2013.01)

(58) Field of Classification Search
CPC ......... G06F 2221/033; G06F 2201/865; G06F 21/56; G06F 21/52; H04L 2209/127
See application file for complete search history.

(56) References Cited

U.S. PATENT DOCUMENTS

| | | | |
|---|---|---|---|
| 9,569,338 B1* | 2/2017 | Bradbury | G06F 11/3636 |
| 9,634,920 B1* | 4/2017 | Goldberg | H04L 43/10 |
| 9,843,596 B1* | 12/2017 | Averbuch | H04L 63/1416 |
| 2004/0205411 A1* | 10/2004 | Hong | G06F 21/566 |
| | | | 714/38.1 |
| 2006/0282708 A1* | 12/2006 | Jiang | G06F 11/0709 |
| | | | 714/38.1 |
| 2009/0320021 A1* | 12/2009 | Pan | G06F 11/0715 |
| | | | 718/100 |
| 2010/0122120 A1* | 5/2010 | Lin | G06F 11/076 |
| | | | 714/47.3 |
| 2011/0098973 A1* | 4/2011 | Seidman | G06F 11/0709 |
| | | | 702/179 |
| 2013/0247187 A1 | 9/2013 | Hsiao et al. | |
| 2014/0019985 A1 | 1/2014 | Krajec | |
| 2014/0114442 A1* | 4/2014 | Li | G06F 11/0736 |
| | | | 700/47 |
| 2014/0181794 A1* | 6/2014 | Grawrock | G06F 11/3636 |
| | | | 717/128 |
| 2015/0091594 A1* | 4/2015 | Hamilton | G01R 1/07 |
| | | | 324/750.01 |
| 2015/0143482 A1 | 5/2015 | Barkan | |
| 2015/0161024 A1 | 6/2015 | Gupta et al. | |
| 2015/0248339 A1* | 9/2015 | Mathur | G06F 11/3034 |
| | | | 702/182 |
| 2015/0317475 A1* | 11/2015 | Aguayo Gonzalez | G06F 21/55 |
| | | | 726/23 |
| 2016/0117502 A1* | 4/2016 | Reed | G06F 11/3062 |
| | | | 726/23 |
| 2016/0308900 A1* | 10/2016 | Sadika | G06F 21/552 |
| 2016/0371489 A1* | 12/2016 | Puri | G06F 21/554 |

OTHER PUBLICATIONS

Swedish Office Action issued in corresponding Swedish Patent Application No. 1551649-5 dated May 14, 2019 (5 pages).
Mahinthan Chandramohan et al.; "A Scalable Approach for Malware Detection through Bounded Feature Space Behavior Modeling"; 2013 28th IEEE; ACM International Conference on Automated Software Engineering (ASE); Conference Proceedings Article; pp. 312-322 (11 pages).
International Search Report and Written Opinion issued in corresponding Internation Application No. PCT/SE2016/051259 dated Feb. 9, 2017 (8 pages).
Chongkyung Kil et al; "Remote Attestation to Dynamic System Properties: Towards Providing Complete System Integrity Evidence"; Dependable System & Networks; Jun. 29, 2009; pp. 115-124 (10 pages).
Alex Ramirez et al.; "Software Trace Cache"; IEEE Transactions on Computers, vol. 54, No. 1, Jan. 2005; p. 22-35 (14 pages).

* cited by examiner

METHOD FOR AUTHENTICATING SOFTWARE

CROSS-REFERENCE TO RELATED APPLICATIONS

This application is a U.S. National Stage application of PCT/SE2016/051259, filed Dec. 15, 2016 and published on Jun. 22, 2017 as WO 2017/105326, which claims the benefit of Swedish Patent Application No. 1551649-5, filed Dec. 15, 2015, all of which are hereby incorporated by reference in their entireties.

TECHNICAL FIELD

The invention relates to a method and control unit for authenticating a software and method for identifying deviating functionality in an operating environment.

BACKGROUND ART

It is well-known to monitor communication traffic through a firewall into an operating environment (such as a single computer or a network of computers) and applying different anti-virus protection mechanisms to detect viruses and cyber-attacks that may cause malfunctioning software. Also, it is well known to establish secure communication links between different operating environments to prevent any unauthorized manipulation of the communicated data. However, all current security systems focus the resources to monitor communication traffic between a controlled operating environment and an external environment that is not secure.

FIG. 1 illustrates such a prior art network communication set-up 10, comprising a first network 11 and a second network 12. Each network is provided with a gateway GW 13 and 14 respectively connected to each network 11 and 12 and having a secure communication link 15 established between the first network and the second network, which are considered to be "secure" networks. The secure communication link prevents manipulation of the software executed in the first network and/or the second network.

The disadvantage with only monitoring the communication traffic between a controlled operating environment and an external environment is that abnormal behavior of the software originating from inside the controlled operating environment cannot be detected, and if a virus is introduced into the controlled operating environment without being detected it may spread within the controlled operating environment until the anti-virus program is updated and a scan is performed.

FIG. 2 illustrates a prior art system configuration of a network 20, similar to the first network 11 illustrated in FIG. 1. For illustrative purposes, the network 20 comprises a single computer 21 provided with a firewall 22 and a gateway GW 23 through which the computer 21 is configured to securely communicate with other computers (not shown) over a communication link 24. However, the network 20 may comprise a number of computers, servers and other equipment communicatively connected within a firewall, such as an office environment.

The computer comprises a CPU 25, BIOS 26, Hard drive HD 27 and memory RAM 28, and is considered to be a "secure network", as long as the firewall 22 and Gateway 23 prevents any virus 29 (or other malware) from entering the secure environment of the computer 21. However, any attacks originating from inside the secure environment will not be detected unless an anti-virus program detects it.

In US 2015/0161024 A1 a method for identifying non-benign software applications when the software is executed in a device. By identifying that the software application originates from a "trusted vendor", the software applications are classified as benign. However, if malware is present in the "secure network", identifying that the software originates from a trusted vendor will not prevent malware from being executed.

Tools are available to investigate the functionality of software when executed using trace mapping, one example of trace mapping is disclosed in section 3.3 of the article "Software Trace Cache" by Ramirez et al. [Ref 1]. However, the result from the trace mapping only reveals the functionality of the software in the current environment, and the current environment may be the root cause for an abnormal behavior of the software functionality.

Thus, there is a need to implement a method for preventing malfunctioning software from being executed within a controlled operating environment irrespectively of where the cause of the malfunctioning software originates from.

SUMMARY

An object with the present invention is to provide an improved method for preventing malfunctioning software from being executed within an operating environment compared to prior art solutions.

This object is achieved by a method for authenticating a software according to claim 1.

This object is also achieved by a control unit configured to authenticate a software according to claim 10.

An advantage with the present invention is that any differences between the trusted environment and the operating environment that affects the performance of the software when executed in an operating environment will be detected.

Another object with the present invention is to provide an improved method for quality assurance of input and/or output parameters of software being executed within an operating environment compared to prior art solutions.

This object is achieved by a method for identifying deviating functionality in an operating environment according to claim 19.

An advantage with the present invention is that by monitoring input parameters and/or actions caused by the output parameters, malfunctioning hardware/software within or outside the operating environment will be identified.

Further objects and advantages will be apparent from the detailed description of the invention.

DRAWINGS

DETAILED DESCRIPTION

In order to prevent malfunctioning software from being executed within a controlled operating environment, a solution is provided with the concept to authenticate software by monitoring a fingerprint that represents the software functionality when executed in a network. The fingerprint is created by trace mapping using a set of parameters, and by defining the set of parameters a unique representation of the software functionality may be obtained.

Fingerprints may be created using OpenPAT (The Open Performance Analysis Toolkit), but other suitable techniques to create an electronic fingerprint may be used. It is also preferred to avoid shared resources to create unique fingerprints that do not change over time or are not affected by other programs currently executed in the network.

Figure 1:
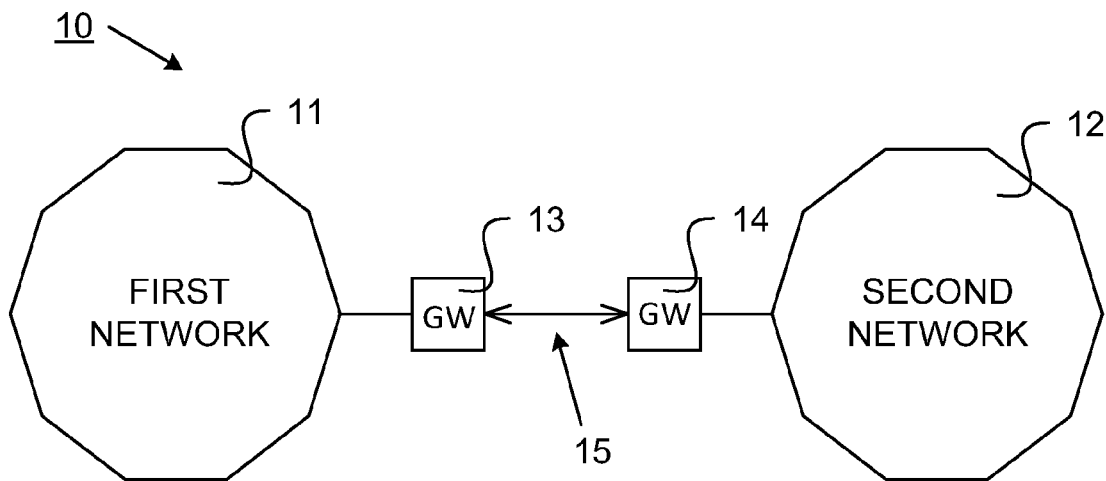
FIG. 1 illustrates a prior art network communication set-up, wherein a secure communication link is used between two "secure" network.
Figure 2:
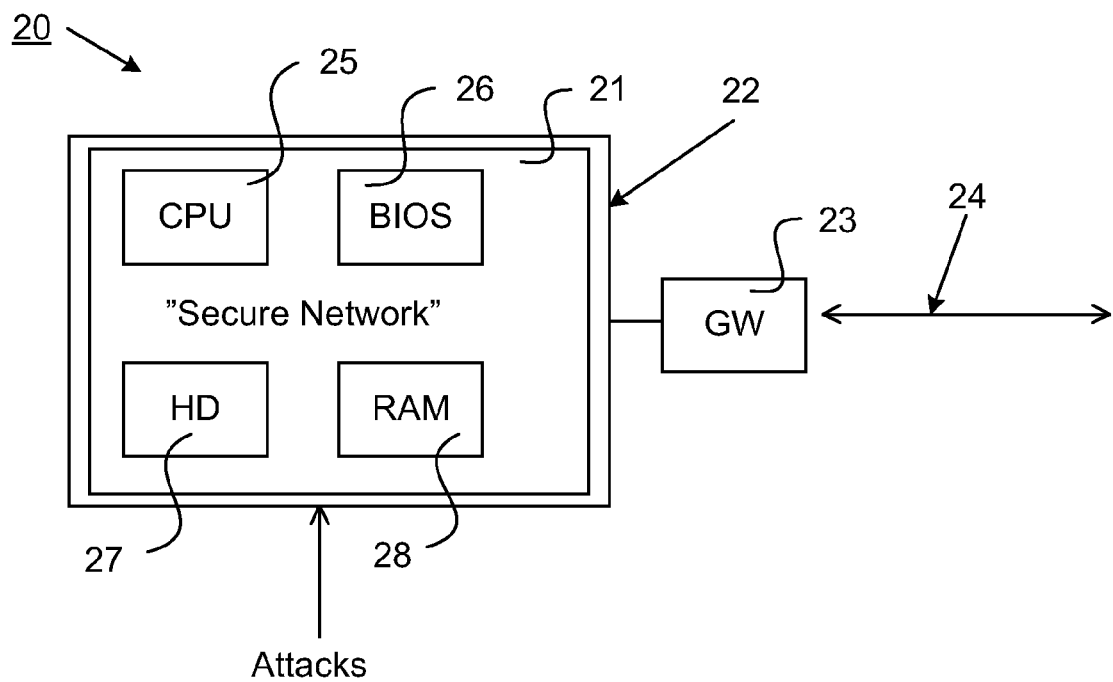
FIG. 2 illustrates a prior art system configuration of a network illustrated in FIG. 1.
Figure 3:
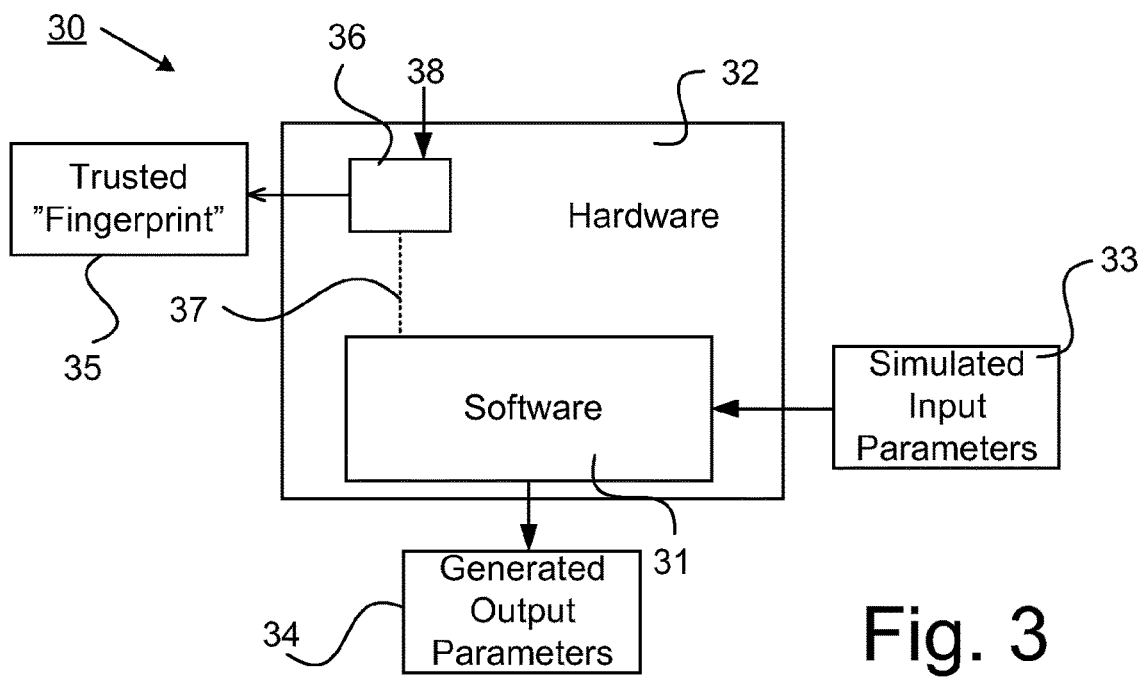
FIG. 3 illustrates an example of a hardware set-up for a trusted environment configured to create a trusted fingerprint when executing software, according to the invention.

FIG. 3 illustrates an embodiment of a system 30 configured to create a trusted fingerprint 35 when executing at least one software 31 in hardware constituting a trusted environment 32. The software 31 is designed to receive specified input parameters and to generate specified output parameters in response to the input parameters according to a performance specification. In order to create the trusted fingerprint 35, simulated input parameters 33 are provided to the software 31 to produce generated output parameters 34 when executed.

A trace mapper 36 may be provided together with the hardware 30 in the trusted environment 32, and the trace mapper is designed to monitor the execution of the software 31 as indicated by 37 as shown in FIG. 3. A set of parameters 38, which represents the software functionality when executed, is defined and used by the trace mapper 36 for trace mapping the software. The trusted finger print 35 is created by trace mapping the software using the set of parameters when executed in the trusted environment.

The trace mapper may also be implemented separate from the trusted environment provided the trace mapper is configured to monitor the execution of the software 31 to create the trusted fingerprint 35 by trace mapping the software using the set of parameters when executed in the trusted environment.

Figure 4:
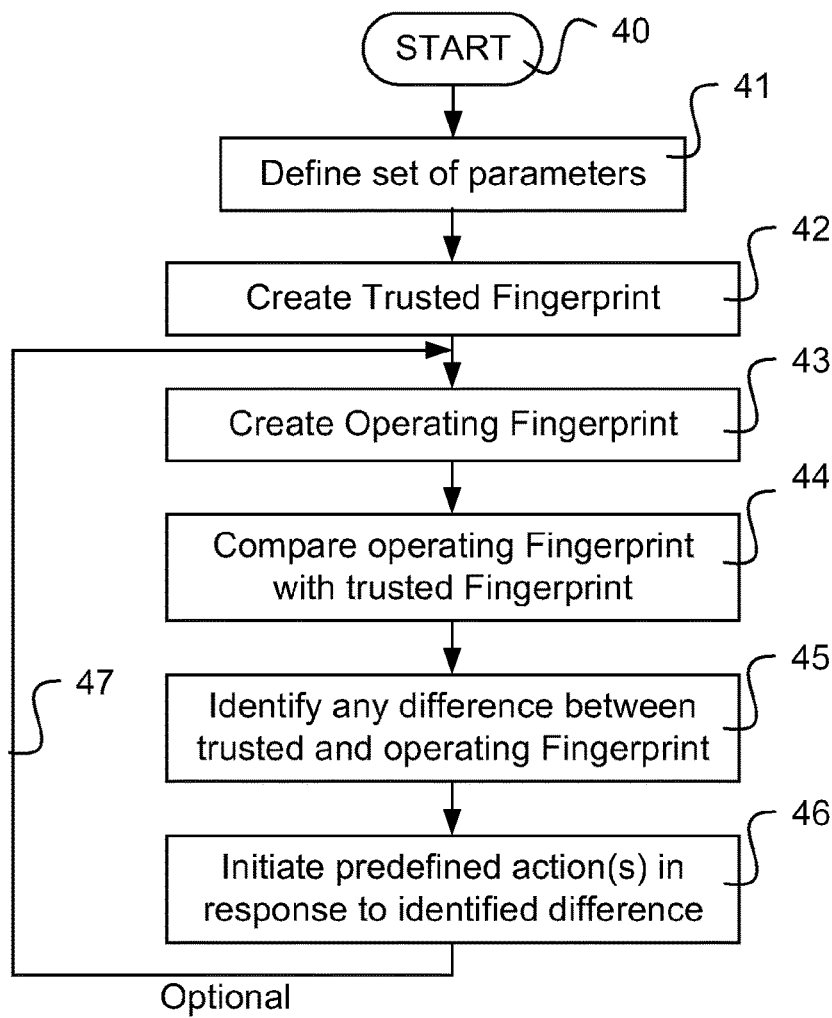
FIG. 4 illustrates a first embodiment of a method implementing the invention.

FIG. 4 illustrates a first embodiment of a method for authenticating software. The flow starts in step 40, and continues to step 41 in which a set of parameters to use for trace mapping is defined, the defined set of parameters represents software functionality when executed. The set of parameters may be selected from the group: input parameters, output parameters, communication parameters, instruction flow parameters and/or heap data.

In step 42, a trusted fingerprint is created by trace mapping the software using the defined set of parameters when executed in a trusted environment, as described in connection with FIG. 3. The trusted fingerprint is preferably stored in a memory, preferably in a read-only memory ROM to prevent intentional (or unintentional) changes of the trusted fingerprint when used in the following steps.

When a trusted fingerprint has been created the flow continues to step 43, in which an operating fingerprint is created. In order to achieve this, the software has to be implemented in an operating environment, and the operating fingerprint is created by trace mapping the software when executed in the operating environment using the same set of parameters that was used to create the trusted fingerprint in step 42.

In step 44, the trusted fingerprint and the operating fingerprint are compared with each other, and any difference between the trusted fingerprint and the operating fingerprint is identified in step 45.

The main objective with the comparison step is to authenticate that the execution of the software in the operating environment is identical to the execution of the software in the trusted environment. The definition of the set of parameters, the quality of the trusted environment and the risk of having a compromised "trusted environment" will determine how good the created trusted fingerprint is.

When the operating fingerprint is non-identical with the trusted fingerprint, at least one predefined action is initiated, step 46, in response to the identified difference between the trusted fingerprint and the operating fingerprint.

The predefined action(s) may comprise:
terminating the execution of the software, and/or
dumping full or partial execution state produced by the software to a secondary storage, and/or
notifying a user of the identified difference.

If the identified difference indicates a non-acceptable behavior, the full or partial execution state produced by the software is dumped to a secondary storage, such as a disk, for further analysis before any further action may be needed. However, if the identified difference between the trusted fingerprint and the operating fingerprint indicates a severe problem, the executing of the software may be terminated. If the identified difference between the trusted fingerprint and the operating fingerprint is of minor importance, or other conditions will not allow a termination of the execution of the software, a user will be notified of the identified difference. Any combination of the above is naturally possible.

When the operating fingerprint is identical with the trusted fingerprint, the flow may be fed back to step 43, with the object to create an updated operating fingerprint, as indicated by 47 in FIG. 4. Steps 43 to 47 are thereafter repeated until the predefined action(s) described above is/are initiated in step 46. However, this is an optional step since some implementations of the present invention does not require a feedback loop.

When defining the set of parameters, it is possible to select a limited number of parameters to minimize the resources necessary to generate the operating fingerprint during execution of the software. If too many parameters are included in the set of parameters, the overall performance when executing the software will be undesirably affected. However, if too few parameters are included in the set of parameters, the created trusted fingerprint may not characterize the behavior of the software functionality in enough detail to identify any difference when comparing it with the created operating fingerprint.

Figure 5:
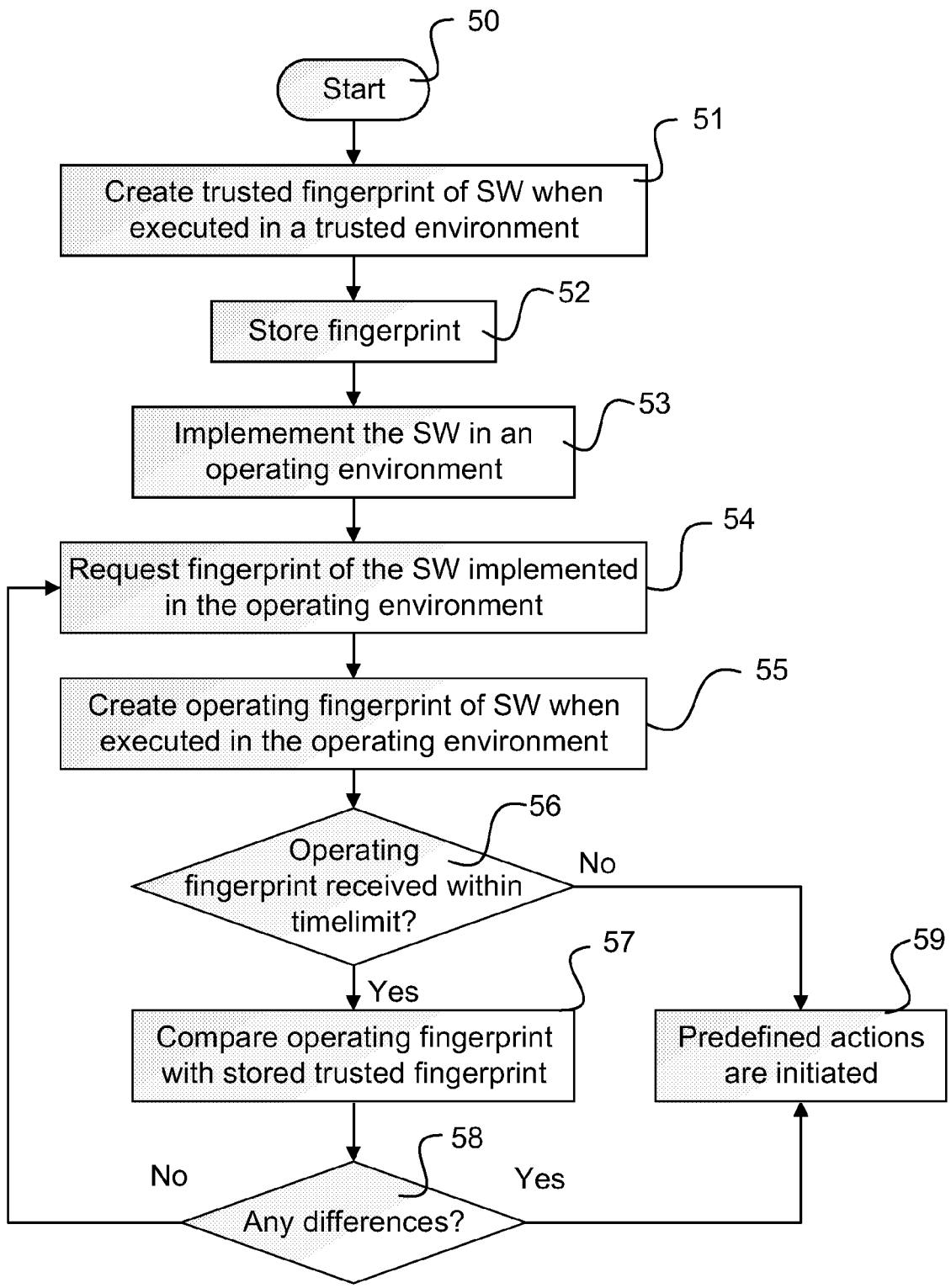
FIG. 5 illustrates a second embodiment a method implementing of the invention.

FIG. 5 illustrates a second embodiment of a method for authenticating software. The flow starts in step 50 and continues to step 51, in which a trusted fingerprint is created by trace mapping; the software using a defined set of parameters when executed in a trusted environment. The trusted fingerprint is stored in a memory, preferably a read-only memory ROM, in step 52.

The software is implemented in an operating environment in step 53. The operating environment may comprise a single computer, equipment (including computers and servers) configured to communicate with each other in a restricted network, such as LAN, WAN, etc., or even equipment communicating with each over Internet, such as cloud implemented networks.

Step 54 is an optional step, in which a trig signal requesting an operating fingerprint of the software is received. In response to the trig signal, an updated operating fingerprint of the software when executed in the operating environment is created in step 55. Alternatively, an updated operating fingerprint is created at regular intervals without any trig signal.

Step 56 also illustrate an optional step, in which it is determined if the updated operating fingerprint was received within a predetermined time limit. If a trig signal was used to initiate the creation of the updated operating fingerprint (as described in step 54), the time is measured from the generation of the trig signal to the reception of the updated operating fingerprint. However, if no trig signal is used, the time between the regularly received updated operating fingerprints is measured.

If the optional step 56 is not performed or when the measured time is within the predetermined time limit, the flow continues to step 57, in which the operating fingerprint is compared to the stored trusted fingerprint. On the other hand, if step 56 is performed and when the updated operating fingerprint is not received within the predetermined time limit, the flow continues to step 59 and predefined actions are initiated in response to the failure to meet the time limit. These actions may comprise the actions previously described in connection with FIG. 4.

An advantage with the optional step 56 is that even if a cyber-attack manages to cancel the creation of an operating fingerprint during execution of the software, and thereby prevents a comparison to be made, the lack of providing an updated operating fingerprint within a predetermined time limit will be detected and appropriate actions may be initiated.

After step 57, any difference between the operating fingerprint and the trusted fingerprint is identified in step 58. When the operating fingerprint is non-identical with the trusted fingerprint, the flow continues to step 59 and the predefined actions are initiated based on the identified difference.

On the other hand when the operating fingerprint and the trusted fingerprint are identical, the flow continues to the optional step 54 if a trig signal is used to request an updated operating fingerprint, or directly to step 55 if the operating fingerprint is regularly updated. If the optional step 56 is included, a timer is also initialized to measure the time to obtain an updated operating fingerprint.

The advantage with the feedback loop from step 58 to step 54 is that any unscheduled changes in the operating environment that affects the performance of the software when executed in an operating environment will be detected irrespectively of where the change originate from (e.g. from a source within the operating environment or a source outside the operating environment).

Figure 6:
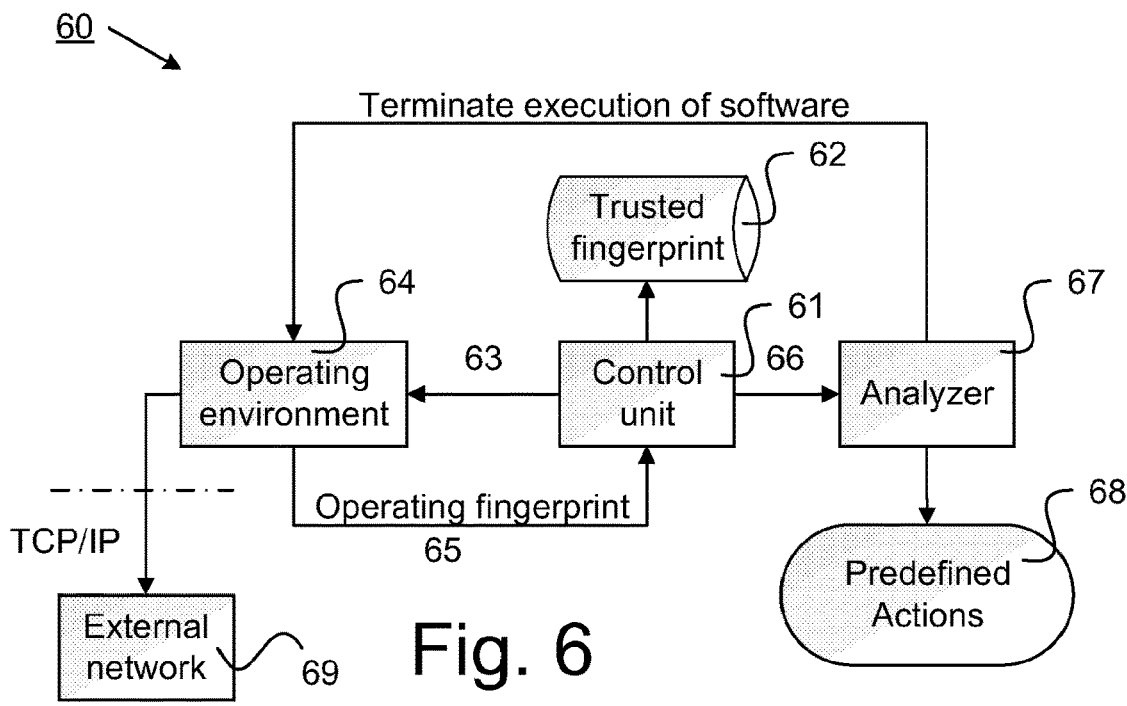
FIG. 6 illustrates an example of a system for authenticating software when executed in an operating environment according to the invention.

FIG. 6 illustrates an embodiment of a system 60 for monitoring the execution of software in an operating environment 64. The system 60 comprises a control unit 61, which may be implemented as a part of the operating network or may be a separate entity (as shown in FIG. 6), a memory 62 for storing a trusted fingerprint previously created, the operating environment 64, and an analyzer 67 configured to initialize predetermined actions 68 when a malfunction is detected. The operating environment 64 may also be connected to an external network 69, for instance via TCP/IP.

The control unit 61 is configured to obtain a trusted fingerprint created by trace mapping the software using a set of defined parameters representing the software functionality when executed in a trusted environment. The trusted finger print may be stored in a separate memory 62 or stored in an internal memory (not shown) of the control unit 61.

The control unit is further configured to obtain an operating fingerprint created by trace mapping the software using the set of defined parameters representing the software functionality when executed in the operating environment 64. A trig signal 63 may be sent from the control unit 61 requesting the operating fingerprint, or the operating fingerprint is created within the operating environment 64 at regular intervals, and the operating fingerprint is provided to the control unit as indicated by 65.

The control unit 61 may also comprise a timer that is initiated to measure the time to obtain an updated operating fingerprint, as previously described in connection with FIG. 5. Thus, the control unit may be configured to obtain information regarding time to obtain the updated operating fingerprint, and if the measured time exceeds a predetermined time limit, initiate predefined action(s) in response to the failure to obtain the updated operating fingerprint within the predetermined time limit.

The control unit 61 is also configured to compare the obtained operating fingerprint with the obtained trusted fingerprint, and identify any difference between the trusted fingerprint and the operating fingerprint; and when the operating fingerprint is non-identical with the trusted fingerprint the analyzer 67 initiates predefined action(s) in response to the identified differences between the trusted fingerprint and the operating fingerprint. The analyzer 67 may be a part of the control unit 61.

As indicated in FIG. 6, the control unit 61 may be implemented outside the operating environment provided with a ROM 62 with trusted fingerprints, the ROM 62 may be externally arranged and the control unit 61 may be configured to obtain the trusted fingerprint through a communication port. The communication port may be dedicated for this purpose to reduce the risk of intentional manipulation when obtaining the trusted fingerprint from the external ROM 62.

The control unit 61 may be configured to regularly request updated operating fingerprint from the software running in the operating environment. Each obtained operating fingerprint is compared with the corresponding trusted fingerprint (as described above) and when the operating fingerprint is non-identical with the trusted fingerprint, instructions may be generated to terminate the execution of the software running in the operating network if the software is critical for the performance. Other predetermined actions that may be the response to an identified difference between the operating fingerprint and the trusted fingerprint is dumping full or partial execution state produced by the software to a secondary storage, for instance a disk and/or notifying a user of the identified differences in a deviation report.

When the operating fingerprint is identical with the trusted fingerprint, the control unit is configured to obtain an updated operating fingerprint and identify any difference between the trusted fingerprint and the updated fingerprint until the predefined action(s) described above is/are initiated. However, requesting an updated operating fingerprint is optional since some implementations of the present invention do not require the control unit to obtain more than one operating fingerprint.

As mentioned above, the security of the system 60 is limited to how good the trusted environment is (where the trusted fingerprint is created), and the trusted environment may be constructed as an island system with preconfigured input parameters that simulate signals generated by external systems interacting with the software during operation. In addition, the trusted environment also generates output parameters that simulate signals used to control external systems. Different scenarios may be evaluated to identify suitable fingerprints that could be used when monitoring the execution of the software in the operating environment.

Furthermore, the invention may also be used to verify configuration of the hardware upon which the software is configured to be executed. For instance, any architectural issues in a computer, malfunctioning components, etc. may be detected before the hardware is connected to a secure network.

Figure 7:
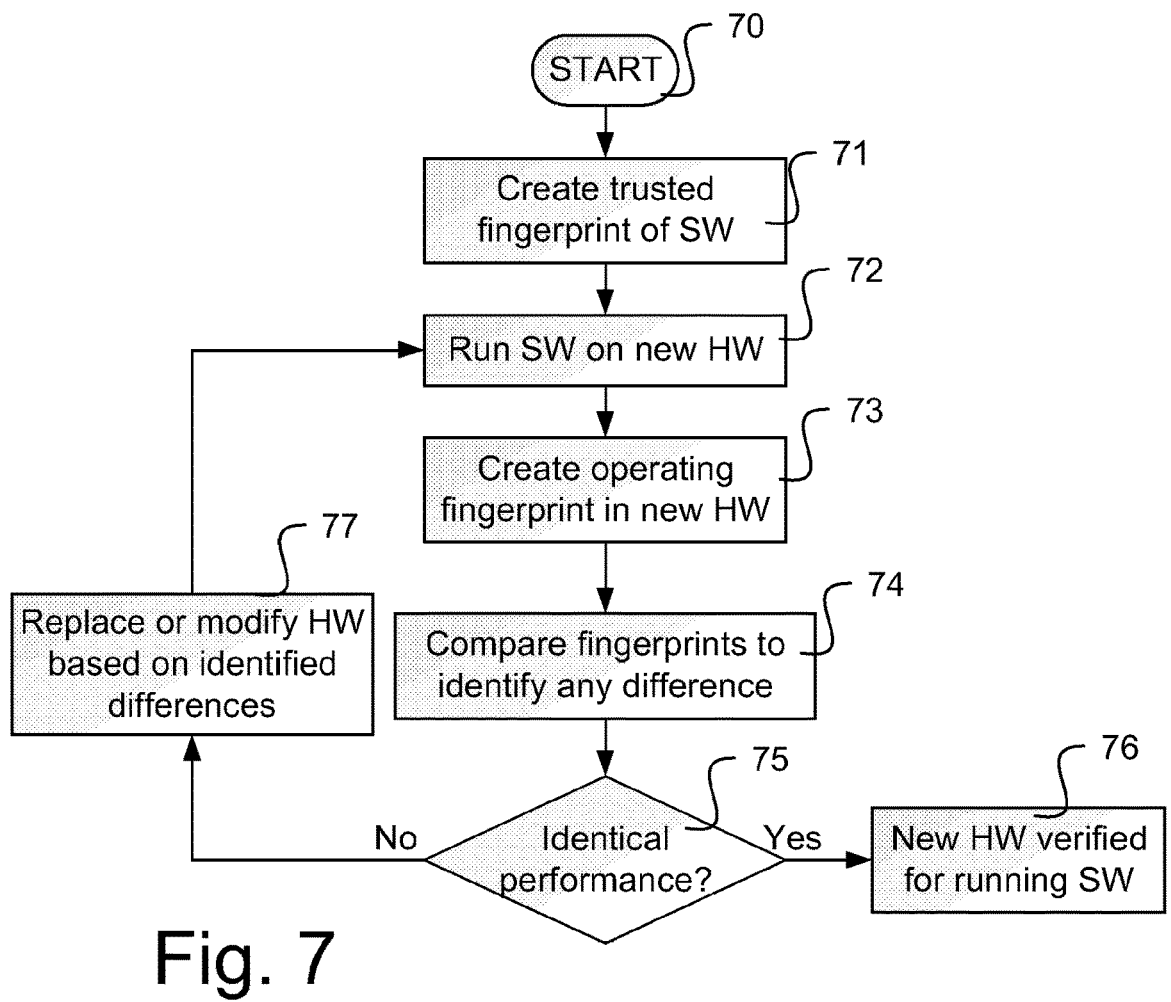
FIG. 7 illustrates an example implementing the invention to verify identical performance when software is executed in a new environment, such as in a new computer.

FIG. 7 illustrates an embodiment implementing the invention to verify identical performance when software is executed in a new environment, such as in a new computer. The flow starts in step 70, and a trusted fingerprint of the software is created in step 71 by trace mapping the software using a set of parameters when executed in the old environment, i.e. hardware representing a trusted environment. The used set of parameters preferably comprises at least communication parameters, instruction flow parameters and heap data to fully characterize the behavior of the software when executed.

The software is implemented in a new environment, i.e. hardware representing an operating environment, and in step 72 the software is executed in the new environment. An operating fingerprint is thereafter created in step 73 by trace mapping the software using the set of parameters when executed in the new environment.

The operating fingerprint is compared with the trusted fingerprint in step 74 to identify any differences between the trusted fingerprint and the operating fingerprint. When the operating fingerprint is identical with the trusted fingerprint, a decision is made in step 75 to continue to step 76, in which the new hardware is verified for running the software.

When the operating fingerprint is non-identical with the trusted fingerprint, a decision is made in step 75 to continue to step 77, in which predefined action(s) are initiated in response to the identified difference between the trusted fingerprint and the operating fingerprint. Such actions may comprise replacing or modifying all, or parts, of the hardware in the new environment based on the identified differences and thereafter repeat steps 72 to 75 72 to 75 until the hardware in the new environment has been verified for running the software.

The process described in connection with FIG. 7 has the advantage that the functionality of a computer intended to be used in a secure network is verified before it is implemented in the secure network, and any hidden or built-in security risks may be detected before causing damage to the secure network.

The described process for monitoring the execution of software in an operating environment also has the benefit that it may be used for quality assurance of external hardware and/or software.

The trusted fingerprint generated when executing the software in the trusted environment relies on input parameters from external hardware and processes according to the predefined specifications of the system. When a field test is performed in the operating environment, input parameters will be generated by the external hardware and processes, and if the fingerprint is defined in such a way that any deviation in input parameters compared to the predefined specifications, then hardware or software issues may be detected.

Figure 8:
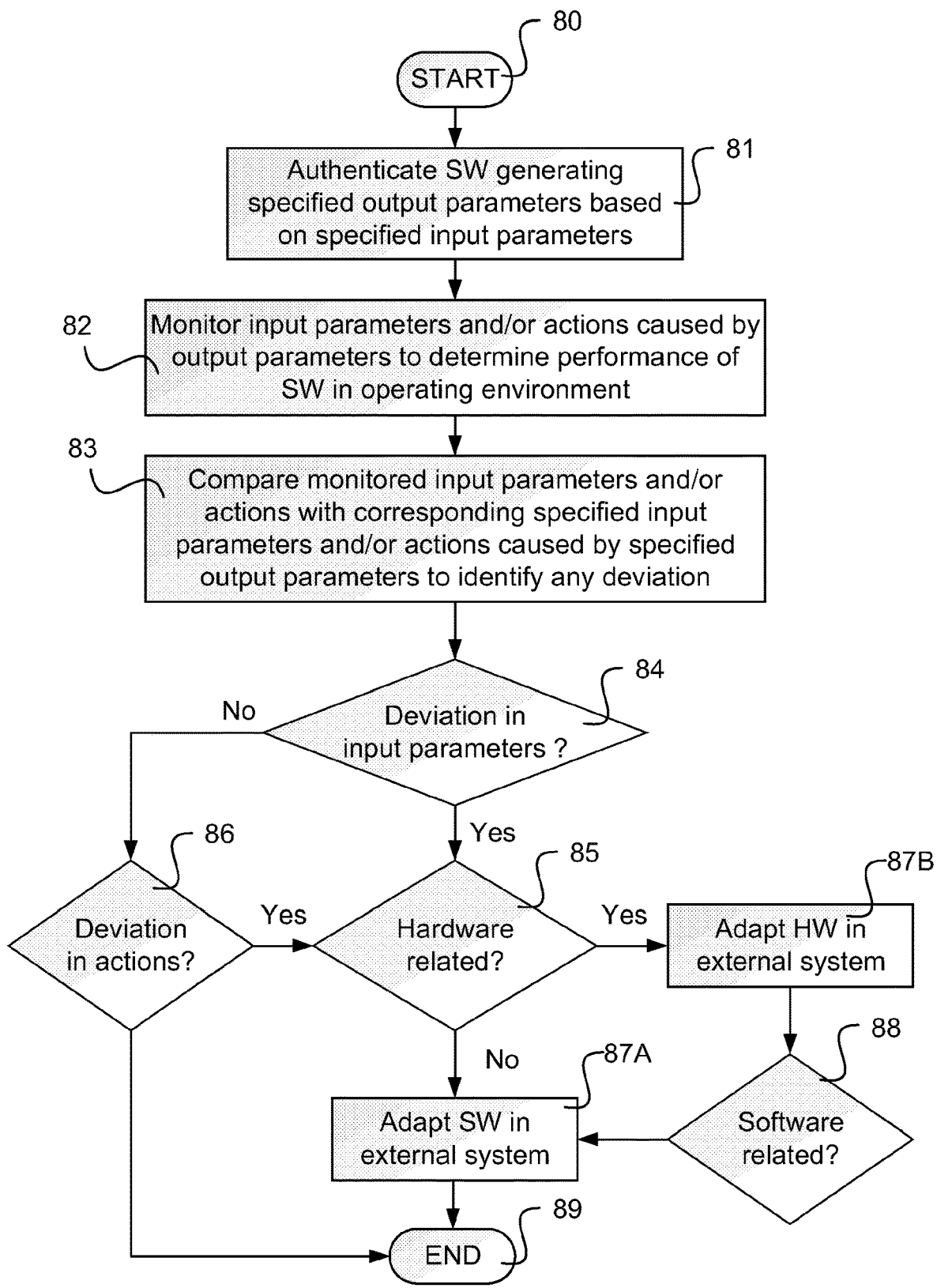
FIG. 8 illustrates an example implementing the invention to update performance in software without having to perform additional field tests.

FIG. 8 illustrates an embodiment implementing the invention to update performance in software without having to perform additional field tests.

The field test is performed with software configured to generate specified output parameters based on specified input parameters, and the output parameters are configured to cause the operating environment to perform specified actions.

The flow starts in step 80, and continues to step 81, in which the software is authenticated as previously described in connection with FIGS. 4 and 5. Input parameters and/or actions caused by the output parameters are monitored in step 82 to determine the performance of software when executed in the operating environment where the field test is performed.

In step 83, the monitored input parameters and/or actions are compared with the corresponding specified input parameters and/or actions, and any deviation between the monitored and the specified input parameters and/or actions is identified.

When any deviation is identified, the functionality in external components outside the operating environment is corrected, as described in steps 84-89.

The flow continues to step 84, in which deviation in input parameters generated inside and/or outside the operating environment is assessed. If input parameters have been monitored and when a deviation has been identified between the monitored input parameters and the specified input parameters, the flow continues to step 85. On the other hand, if input parameters have not been monitored or no deviation has been identified between the monitored input parameters and the specified input parameters, the flow continues to step 86.

In step 86, deviation in actions caused by the output parameters is assessed. If actions have been monitored and when a deviation has been identified between the monitored actions and the specified actions, the flow continues to step 85. On the other hand, if actions have not been monitored or no deviation has been identified between the monitored actions and the specified actions, the flow ends in step 89.

Any identified deviation in input parameters and/or actions caused by the output parameters has to be addressed to correct the functionality of the operating environment (i.e. external systems interaction with the software) and the identified deviations may be hardware and/or software related.

In step 85, it is investigated if the deviation is hardware related, and if no hardware malfunction is identified, the flow continues to step 87A, in which the software of the external systems are adapted to eliminate the identified software-related deviation, and the flow ends in step 89.

However, if a hardware malfunction is identified, the flow continues to step 87B, in which the hardware of the external systems are adapted to eliminate the identified hardware-related deviations. There is a possibility that the identified deviations are both software and hardware related, and in the following step 88 it is investigated if the identified deviation is also software related.

If the identified deviation also is software related, the flow continues to step 87A, but if the identified deviation is only hardware related, the flow ends in step 89.

The advantage obtained by monitoring input parameters/actions caused by the output parameters is that quality assurance may be achieved and malfunctioning external hardware and/or software will be identified. The authentication of the software in the operating environment ensures the functionality of the software provided the input parameters are according to specifications.

It should be noted that at least one of the input parameters may be generated outside the operating environment and the step of correcting the functionality comprises determining malfunctioning external components based on the identified deviation between the monitored and the specified input parameters. Similarly, at least one of the input parameters may be generated within the operating environment and the step of correcting the functionality comprises determining malfunctioning components of the operating environment based on the identified deviation between the monitored and the specified input parameters.

The step of correcting the functionality may also comprise determining malfunctioning external components based on the identified deviation between the monitored actions and the specified actions caused by the output parameters from the software.

Figure 9A:
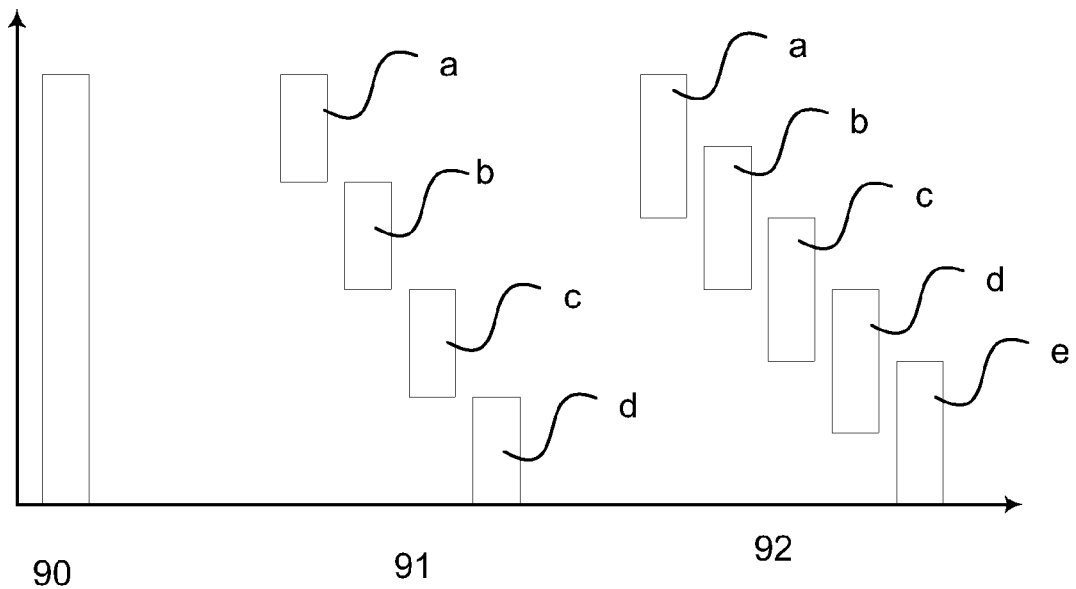
FIG. 9a illustrates how a set of parameters can be divided into subsets, either non-overlapping or overlapping.

FIG. 9a illustrates how a set of parameters can be divided into subsets, either non-overlapping or overlapping.

A defined set of parameters 90 that is used for trace mapping the software may allocate too much computational resources, and thereby slow down the overall performance of the software when executed. One alternative is to divide the set of parameters 90 into multiple subsets of parameters as illustrated by 91*a-d* (non-overlapping) and 92*a-e* (overlapping). Another alternative is to reduce the set of parameters to include less parameters, although with the disadvantage that fewer parameters are used for trace mapping the software when executed.

If the set of parameters are divided into multiple subsets of parameters then a subset sequence having a predetermined order of the multiple subsets of parameters has to be determined before creating a trusted fingerprint. Thereafter, the set of parameters used for trace mapping the software may be replaced by the subset sequence and used to create the trusted fingerprint in step 42, 51 and 71, and the operating fingerprint in step 43, 55, 73.

An advantage with dividing the set of parameters into subsets is that less computational resources are necessary to generate and compare the fingerprints during operation and thus will affect the performance of the execution of the software less.

In FIG. 9a, two different embodiments illustrating how to divide the set of parameters 90 into subsets of parameters 91*a-d* and 92*a-e*. In the first embodiment 91*a-d*, each subset of parameters is selected to non-overlap with other subsets of parameters within the subset sequence. This will cover many different parameters efficiently.

In the second embodiment, each subset of parameters is selected to overlap the other subsets of parameters within the subset sequence. However, any combination of the two embodiments are possible, e.g. at least one subset of parameters may be selected to overlap with at least one other subset of parameters within the subset sequence.

Figure 9B:
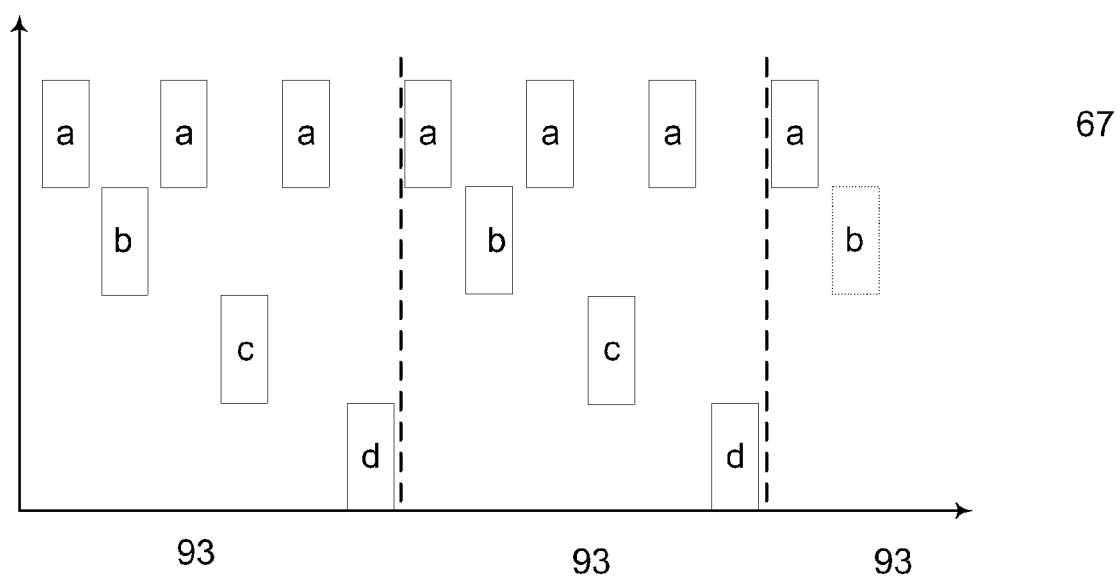
FIG. 9b illustrates a subset sequence with non-overlapping subsets.

FIG. 9b illustrates a subset sequence with non-overlapping subsets.

A subset of parameters may be more important to use for trace mapping and FIG. 9b illustrates an example of a subset sequence 93, where subset "a" is repeated three times within each subset sequence. Subset "b", "c" and "d" are only selected once within each subset sequence. It should be noted that at least one subset of parameters may be selected to be repeated more than once within the subset sequence.

An advantage with repeating at least one subset of parameters (e.g. communication parameters), which contains parameters of interest, is obvious since the resources required to perform the authentication of the software is reduced, while parameters of interest are used more often for trace mapping the software when executed.

Figure 10:
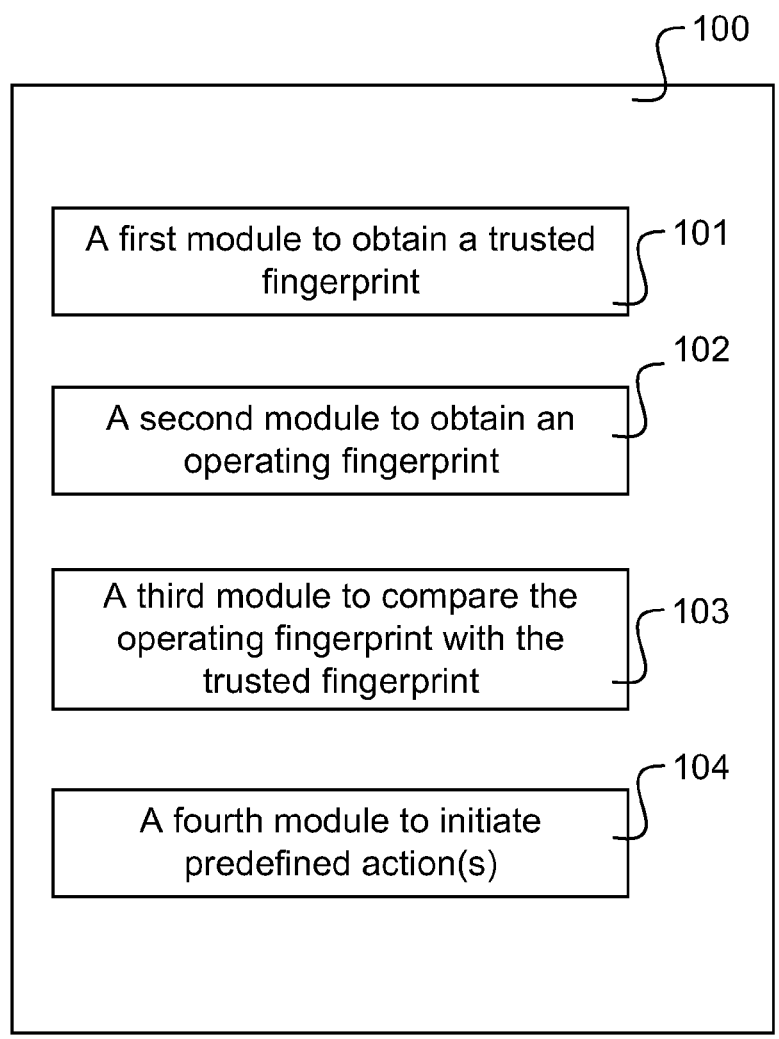
FIG. 10 illustrates a control unit according to the invention.

FIG. 10 illustrates an embodiment of a control unit 100 for authenticating a software according to the invention. The control unit comprises four modules 101-104 described below.

A first module 101 to obtain a trusted fingerprint created by trace mapping the software using a set of defined parameters representing the software functionality when executed in a trusted environment.

A second module 102 to obtain an operating fingerprint created by trace mapping the software using the set of defined parameters representing the software functionality when executed in an operating environment.

A third module 103 to compare the operating fingerprint with the trusted fingerprint, and to identify any difference between the trusted fingerprint and the operating fingerprint.

A fourth module 104 to initiate predefined action(s) in response to the identified differences between the trusted fingerprint and the operating fingerprint, when the operating fingerprint is non-identical with the trusted fingerprint.

The first module 101 may comprise a read-only memory, wherein the trusted fingerprint is stored, or the first module is provided with access to a communication port (preferably a dedicated communication port) through which an externally arranged memory can be obtained.

The fourth module 104 may comprise a secondary storage configured to provide space for dumping full or partial execution state produced by the software to a secondary storage.

The second module 102 may generate a trig signal to obtain an updated operating fingerprint and the third module 103 may identify any difference between the trusted fingerprint and the updated operating fingerprint until the predefined action(s) is/are initiated in the fourth module 104.

The third module 103 may also comprise a timer to measure the time to obtain the updated operating fingerprint; and, if the measure time exceeds a predetermined time limit, the fourth module 104 may initiate predefined actions in response to the failure to obtain the updated operating fingerprint within the predetermined time limit.

REFERENCES

1) "Software Trace Cache" by A Ramirez, J-L Larriba-Pey, C Navarro, J Torrellas and M Valero; published in IEEE Transactions on Computers, February 2005.

The invention claimed is:
1. A method for authenticating a software, said method comprises defining a set of parameters to use for trace mapping the software, said set of parameters representing the software functionality when executed, the method further comprises:

a) creating a trusted fingerprint, said trusted fingerprint is created by trace mapping the software using said set of parameters when executed in a trusted environment;

b) creating an operating fingerprint, said operating fingerprint is created by trace mapping the software using said set of parameters when executed in an operating environment;

c) comparing said operating fingerprint with said trusted fingerprint, and identifying any difference between the trusted fingerprint and the operating fingerprint; and d) when said operating fingerprint is non-identical with said trusted fingerprint, initiating predefined action(s) in response to the identified difference between the trusted fingerprint and the operating fingerprint;

wherein the method further comprises:

dividing said set of parameters into multiple subsets of parameter;

prior to performing step a) determining a subset sequence having a predetermined order of said multiple subsets of parameters; and replacing said set of parameters with said subset sequence to create said trusted fingerprint in step a) and said operating fingerprint in step b).

2. The method according to claim 1, wherein the predefined action(s) initiated in step d) comprises:

terminating the execution of the software, and/or dumping full or partial execution state produced by the software to a secondary storage, and/or notifying a user of the identified difference.

3. The method according to claim 1, wherein the method further comprises:

e) when said operating fingerprint is identical with said trusted fingerprint, repeating steps b)-e) to update said operating fingerprint and identify any difference between the trusted fingerprint and the updated operating fingerprint, until the predefined action(s) is/are initiated in step d).

4. The method according to claim 3, wherein step e) is performed at regular intervals; or step e) is performed in response to a trig signal.

5. The method according to claim 3, wherein the method further comprises:

initializing a timer when performing step e);

measuring the time to obtain the updated operating fingerprint; and when the measure time exceeds a predetermined time limit, initiating predefined actions in response to the failure to obtain said updated operating fingerprint within the predetermined time limit.

6. The method according to claim 1, wherein the method further comprises selecting at least one subset of parameters to be repeated more than once within the subset sequence.

7. The method according to claim 1, wherein the method further comprises selecting at least one subset of parameters to overlap with at least one other subset of parameters within the subset sequence; or selecting each subset of parameters to non-overlap with other subsets of parameters.

8. The method according to claim 1, wherein said set of parameters is selected from the group: input parameters, output parameters, communication parameters, instruction flow parameters and/or heap data.

9. A method for identifying deviating functionality in an operating environment, the method comprises:

authenticating software according to claim 1, said software is configured to generate specified output parameters based on specified input parameters, and said output parameters are configured to cause the operating environment to perform specified actions;

monitoring input parameters and/or actions caused by said output parameters to determine the performance of the software when executed in the operating environment;

comparing the monitored input parameters and/or actions with the corresponding specified input parameters and/or actions, and identifying any deviation between the monitored and the specified input parameters and/or actions; and when any deviation is identified, correcting the functionality in the operating environment.

10. The method according to claim 9, wherein at least one of said input parameters are generated outside the operating environment and said step of correcting the functionality comprises determining malfunctioning external components based on the identified deviation between the monitored and the specified input parameters.

11. The method according to claim 9, wherein at least one of said input parameters are generated within the operating environment and the step of correcting the functionality comprises determining malfunctioning components of the operating environment based on the identified deviation between the monitored and the specified input parameters.

12. The method according to claim 9, wherein said step of correcting the functionality comprises determining malfunctioning external components based on the identified deviation between the monitored and the specified actions caused by said output parameters.

13. A control unit for authenticating a software, comprising a processor and a memory, said memory containing instructions executable by the processor, the control unit is configured to:

obtain a trusted fingerprint created by trace mapping the software using a set of defined parameters representing the software functionality when executed in a trusted environment;

obtain an operating fingerprint created by trace mapping the software using the set of defined parameters representing the software functionality when executed in an operating environment;

compare said operating fingerprint with said trusted fingerprint, and identify any difference between the trusted fingerprint and the operating fingerprint;

when said operating fingerprint is non-identical with said trusted fingerprint, initiate predefined action(s) in response to the identified differences between the trusted fingerprint and the operating fingerprint;

wherein the control unit is further configured to:

dividing said set of parameters into multiple subsets of parameter;

prior to performing step a) determining a subset sequence having a predetermined order of said multiple subsets of parameters; and replacing said set of parameters with said subset sequence to create said trusted fingerprint in step a) and said operating fingerprint in step b).

14. The control unit according to claim 13, wherein said trusted fingerprint is stored in a read-only memory.

15. The control unit according to claim 14, wherein said read-only memory is provided in said control unit.

16. The control unit according to claim 14, wherein said control unit is provided with a communication port, and said read-only memory is externally arranged and obtainable through the communication port.

17. The control unit according to claim 16, wherein said communication port is dedicated to obtain said trusted fingerprint.

18. The control unit according to claim 13, wherein the control unit is further configured to select the predefined action(s) to be initiated from the group:
- to terminate the execution of the software, and/or
- dumping full or partial execution state produced by the software to a secondary storage, and/or
- to notify a user of the identified differences.

19. The control unit according to claim 13, wherein the control unit is further configured to:
- when said operating fingerprint is identical with said trusted fingerprint, obtain an updated operating fingerprint and identify any difference between the trusted fingerprint and the updated operating fingerprint until the predefined action(s) is/are initiated.

20. The control unit according to claim 19, wherein the control unit is further configured to receive the operating fingerprint at regular intervals; or the control unit is configured to send a trig signal requesting the operating fingerprint.

21. The control unit according to claim 19, wherein the control unit is further configured to:
- obtain information regarding time to obtain the updated operating fingerprint; and
- if the measure time exceeds a predetermined time limit, initiate predefined actions in response to the failure to obtain said updated operating fingerprint within the predetermined time limit.

* * * * *